May 3, 1932.  F. H. MOORE  1,856,651
WINDSHIELD WARMER
Filed Nov. 20, 1929  2 Sheets-Sheet 1

Frank H Moore
INVENTOR

BY
ATTORNEY

May 3, 1932.　　　F. H. MOORE　　　1,856,651
WINDSHIELD WARMER
Filed Nov. 20, 1929　　　2 Sheets-Sheet 2

Frank H Moore
INVENTOR
BY
ATTORNEY

Patented May 3, 1932

1,856,651

UNITED STATES PATENT OFFICE

FRANK H. MOORE, OF CARLTON, OREGON, ASSIGNOR OF ONE-FOURTH TO HERBERT W. BLADORN, OF CARLTON, OREGON

WINDSHIELD WARMER

Application filed November 20, 1929. Serial No. 408,646.

My invention relates to automotive and other vehicles. The same is to be used in combination with the windshield and has for its primary purpose the warming and drying of the same to thereby prevent the congealing of frost, ice and snow particles upon the exterior of the windshield to thereby destroy its usability as a transparent shield for the protection of the manipulator of the vehicle.

My invention is primarily intended for use upon motor vehicles, but the same may be used with equal facility upon speed boats, motor boats and the like.

The invention consists primarily in placing a diaphragm within the engine or motor chamber of the vehicle in which an adjustable damper is placed that is adapted for being manipulated at a convenient position for the driver of the vehicle. Means are provided for the collecting and draining of moisture from the discharge outlet for the warmed air. Means are also provided for admitting a desired amount of heated air from the engine chamber of the motor vehicle and for discharging the same through the cowl of the automotive vehicle and at the base of the windshield to thereby warm and dry the windshield.

Means are further provided in the form of separator plates for predetermining the path of the warmed air being passed through the channels formed by the plates and to be discharged at the base of the windshield.

The primary object of my device is to prevent the congealing of rain, snow or ice upon a windshield.

A further object of my device consists in providing simple means for the warming of the windshield in cold weather and for the drying of the windshield when the temperature is above that of freezing to prevent the forming of a film of frost, or moisture, upon the exterior of the windshield.

A still further object of my invention consists in providing simple means for the regulating of the amount of warmed air that is to be distributed upon the windshield and that is obtained from the automotive engine.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings.

Like reference characters refer to like parts throughout the several views.

Figures 1, 2:
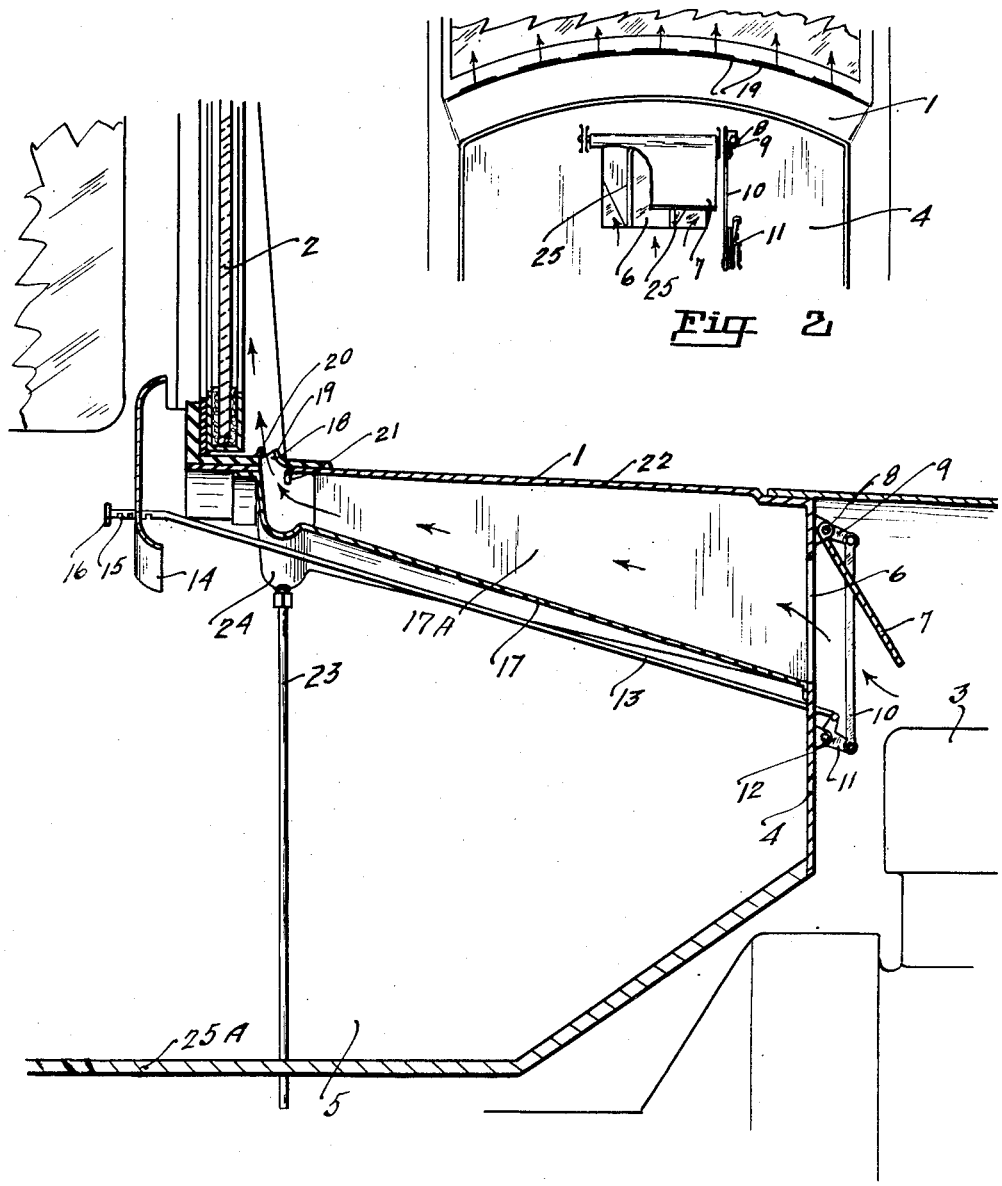
Fig. 1 is a sectional, side elevation of the cowl of an automotive vehicle and illustrating one of my new and improved devices in position upon the automotive vehicle, the same being shown in side elevation.
Fig. 2 is a front view, partially in section of one of my new and improved devices illustrated in position upon an automotive vehicle.
Figure 3:
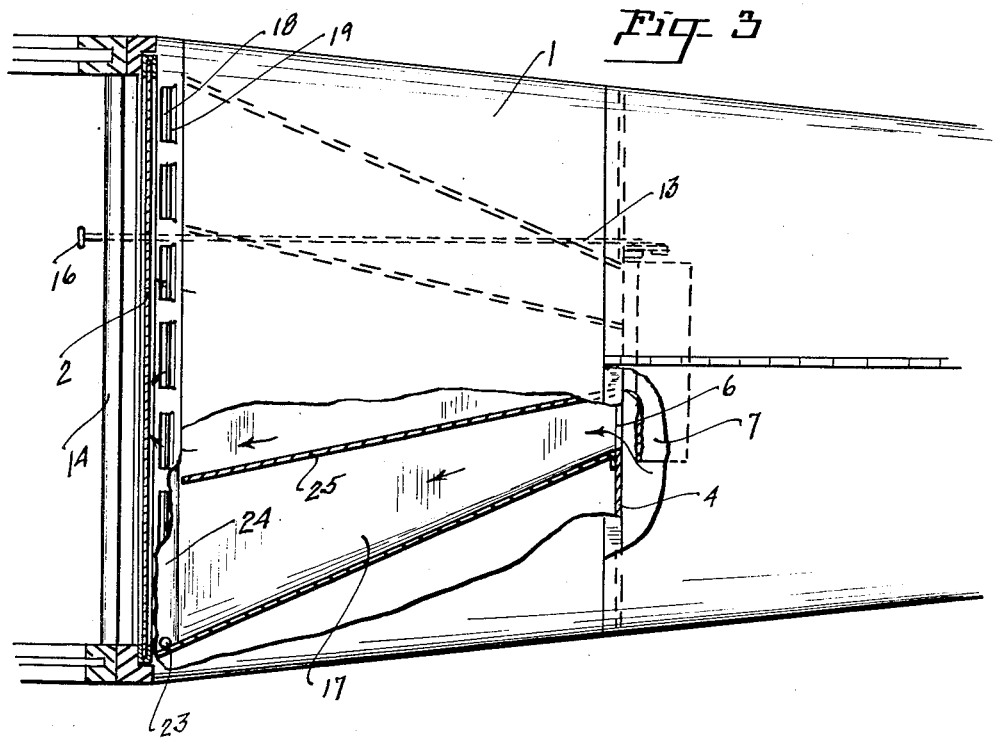
Fig. 3 is a top, plan view, partially in section, of an automotive vehicle and illustrating my new and improved device disposed therein.
Figure 4:
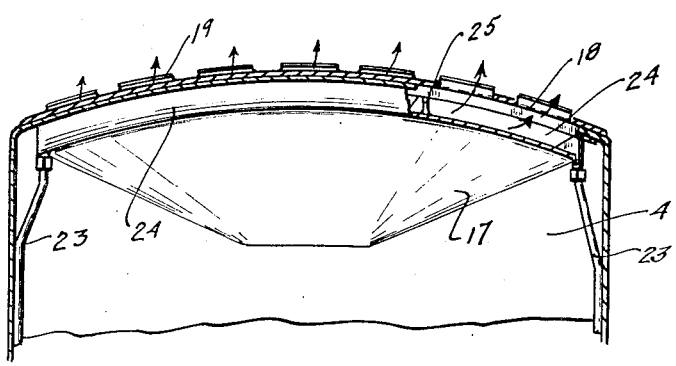
Fig. 4 is a sectional, end view of the assembled device, the same being taken on line 4—4 of Fig. 3 looking in the direction indicated.

I have here shown my device as being disposed upon an automobile but I do not wish to be limited to the application of my device to automobiles as the same is adaptable for use upon many other forms of vehicles and conveyances and may even be used upon shipboard and is especially adapted for use upon speed boats, motor boats and the like.

1 is the cowl of the automobile and 2 is the windshield of the automobile. 3 is the automotive engine.

I place a diaphragm 4 between the engine and the exterior 5 of the body of the vehicle. An opening 6 is cut through the diaphragm 4 and a damper 7 is placed over it and which is adapted for manual manipulation from a convenient location within the motor vehicle. The damper 7 is hingedly supported upon a damper rod 8. The damper rod 8 terminates upon its one end in a lever 9. The lever 9 is manipulated by a lever system composed of a connecting link 10 that is disposed between the arm 9 and the bell crank 11. The bell crank 11 is rockably disposed about a supporting journal 12. An actuating lever 13 extends from the bell crank 11 and terminates upon a supporting bar 14 having an opening therethrough. Notches 15 are disposed upon one edge of the actuating lever which permits the lever to be maintained in a fixed position upon the supporting bar 14. The purpose of the notches is to permit adjustment of the damper 7 to the desired position. A pull knob 16 is disposed upon the other end of the lever 13 to facilitate its handling. A chamber 17" for the heated air that is developed is composed of a sheet 17 that forms its bottom, the cowl 1 of the automobile forms its top, the upper part of the diaphragm 4 forms one side, and the lower part of the windshield frame forms the other side. The opening 6 in the diaphragm 4 leads into the chamber 17". Discharge slots 18 are disposed through the chamber adjacent the base of the windshield 2. Lips 19 and 20 upwardly extend from the normal surface of the cowl to prevent the undue drainage of water therein. An inner lip 21 downwardly extends from the cowl into the chamber within the space adjacent the slots to prevent the water, that does enter the slots, from passing directly into the motor chamber by draining down the inner side 22 of the cowl surface. The chamber 17" has a groove 24 laterally of its bottom and in registerable alignment with the slots. The bottom of the chamber is inclined upwardly. Drain pipe 23 leads from the groove 24 through the floor board 25A and is adapted for collecting any condensation that enters the chamber. In order to distribute the warmed air over the entire front of the windshield, I place a plurality of director plates 25 within the chamber. The warmed air is passed through the chamber and is deflected up and out by the lips 19 and 20 and passes upward along the windshield and warms the same.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described the combination of a windshield, said warmer comprising a chamber having deflector plates disposed therein, one side of said chamber consisting of a diaphragm, an opening disposed within the diaphragm, slots disposed through the chamber adjacent the windshield, a groove laterally disposed within the chamber and in registerable alignment with the slots, a plurality of drains disposed through the groove, a damper hingedly disposed over the diaphragm opening, a hand operated lever adjustably positionable within the automobile, and links connecting the lever to the damper.

2. A windshield warmer comprising a chamber having its bottom upwardly inclined, deflectors disposed within the chamber, a groove laterally disposed within the chamber nearest the windshield frame, slots disposed through the top wall of the chamber near the windshield, an opening disposed through the side wall of the chamber near the engine, and an adjustable damper disposed over the opening to regulate the amount of air entering the chamber.

FRANK H. MOORE.